United States Patent

Bulleyment

[15] 3,643,150
[45] Feb. 15, 1972

[54] POWER CONVERTER APPARATUS

[72] Inventor: Keith J. Bulleyment, St. Paul, Minn.
[73] Assignee: Honeywell Inc., Minneapolis, Minn.
[22] Filed: Nov. 2, 1970
[21] Appl. No.: 85,955

[52] U.S. Cl. .................................. 321/5, 307/299 A, 321/18, 321/47
[51] Int. Cl. .................................................. H02m 7/24
[58] Field of Search ...................... 321/5, 18, 47; 307/299 A

[56] References Cited

UNITED STATES PATENTS

| | | | |
|---|---|---|---|
| 3,083,328 | 3/1963 | Mallery et al. | 321/47 X |
| 3,134,068 | 5/1964 | Feltman | 321/5 X |
| 3,229,119 | 1/1966 | Bohn et al. | 307/299 A |
| 3,434,034 | 3/1969 | Garber et al. | 321/47 X |

OTHER PUBLICATIONS

RCA Technical Notes, RCA TN No. 627, Aug. 1965, 321-47

*Primary Examiner*—William M. Shoop, Jr.
*Attorney*—Charles J. Ungemach, Ronald T. Reiling and Gordon Reed

[57] ABSTRACT

A power converter and regulator combining regulating and rectifying portions into one output stage. A polyphase signal is separated into individual phases each of which is then applied to one of a number of series-regulating power transistors. The output of the transistors is summed to create a regulated DC output.

12 Claims, 4 Drawing Figures

PATENTED FEB 15 1972 3,643,150

INVENTOR.
KEITH J. BULLEYMENT
BY Gordon Reed
ATTORNEY ically, the invention is intended to eliminate one source of dissipation in a high-current power supply by combining the rectification and regulation stages into a single output stage.

3,643,150

POWER CONVERTER APPARATUS

BACKGROUND OF THE INVENTION

This invention pertains to AC to DC power converter apparatus and more particularly to power converters with inherently low-power dissipation characteristics. More specifically, the invention is intended to eliminate one source of dissipation in a high-current power supply by combining the rectification and regulation stages into a single output stage.

The use of separate stages to achieve the functions of AC–DC conversion and regulation has been typical of prior art devices. A common example of such a configuration consists of a diode bridge used to provide full wave rectification followed by a series type regulator in which a zener diode-controlled power transistor is used to establish a regulated DC voltage. Such a configuration is disclosed at page 227, Figure 16.1, of *General Electric Transistor Manual*, sixth edition. The disadvantage of such circuits with separate stages for rectification and regulation is that increased dissipation occurs in the supply when it is used in a high current, low voltage, DC application. The reason such supplies have higher dissipation is that during the conduction period of the power transistor the current flowing to the load dissipates power in the forward biased diodes of the bridge and the power transistor junctions. As will be shortly explained, the applicant's invention eliminates one of these sources of power dissipation.

A further advantage of applicant's combined converter and regulator circuit is its freedom from noise generation. Switching regulators are frequently used in high current, low-voltage applications but generate considerable noise in operation. Applicant's invention does not suffer from such a drawback. Finally, applicant's invention provides a regulated output which needs little or no filtering, a significant advantage over other low-voltage DC power supplies.

SUMMARY OF THE INVENTION

An AC to DC power converter including means of delivering a number of AC signals of different phases each to separate terminals is connected to power transistors which receive AC signals. A means for providing current to the bases of the power transistors is applied to each of these power transistors to regulate their current output. Means are provided for summing the output signals of each of the power transistors when phase-separated AC signals are applied to them. An output terminal receives the summed DC signals provided.

BRIEF DESCRIPTION OF THE DRAWING

The nature of the invention and distinguishing features and advantages thereof will be more clearly understood from the following detailed description and accompanying drawing in which.

DESCRIPTION OF THE PREFERRED EMBODIMENTS

Figure 1:
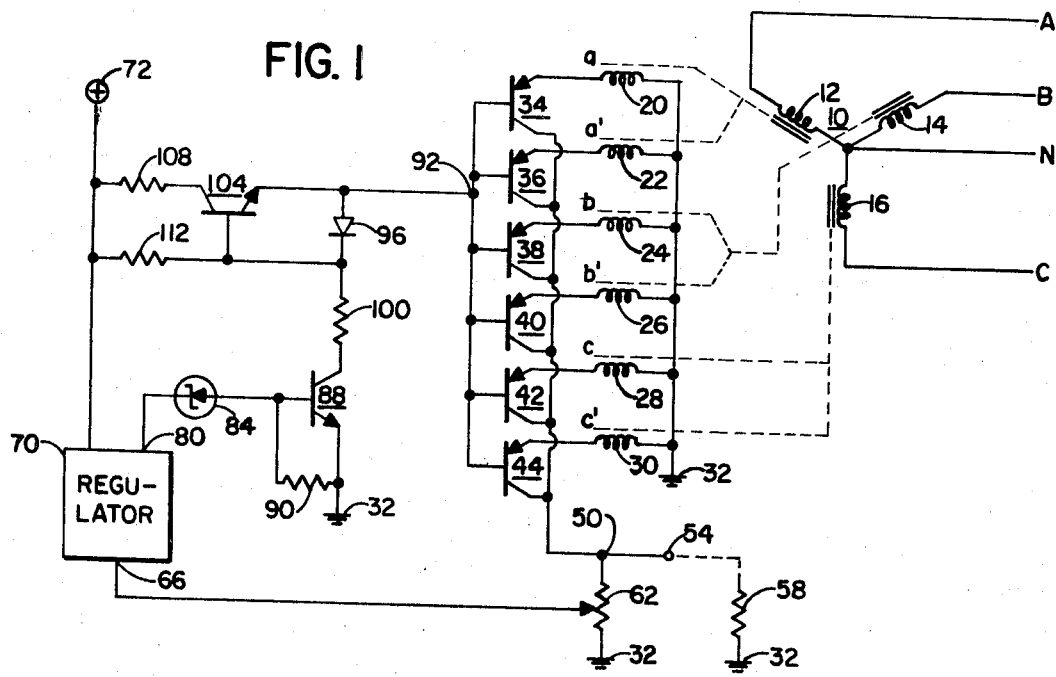
FIG. 1 is a circuit diagram showing a preferred embodiment of the applicant's invention to be used with six-phase input power.

Referring now to the embodiment of applicant's invention in FIG. 1, means 10 for delivering a plurality of phase-separated AC signals, which may be a polyphase transformer, is shown. The polyphase transformer 10 has a Y-connected primary with primary coils 12, 14, and 16. These primary coils receive a three-phase input signal, which each phase of the input 120° separated from the other two. For example, the signal on coil 12 may lead that on coil 14 by 120°, while lagging the signal on coil 16 by 120°. Polyphase transformer 10 has six secondary coils 20, 22, 24, 26, 28 and 30. Dotted lines are used in FIG. 1 to represent the coupling between primary coil 12 and secondary coils 20 and 22, between primary coil 14 and secondary coils 24 and 26, and between primary coil 16 and secondary coils 28 and 30. The secondary coil 20 of primary leg 12 derives an inphase signal from leg 12, while secondary coil 22 generates a signal 180° out of phase. Similarly, the secondary coils 24 and 26 derive their voltages from primary coil 14 and are 180° out of phase. Finally, secondary coils 28 and 30 derive their voltage from primary coil 16, coils 28 having a signal in phase with the primary signal and coil 30 having a signal 180° out of phase with that of coils 28 and 16. One side of each of the secondary coils 20, 22, 24, 26, 28 and 30 of the polyphase transformer 10 is connected to a ground 32. The other end of each of the secondary coils is connected to one of a plurality of power transistors 34, 36, 38, 40, 42, and 44 at the emitter terminal of each transistor. Although the embodiment of FIG. 1 utilizes six power transistors 34, 36, 38, 40, 42 and 44 a six emitter power transistor would work equally well. If a three-phase sinusoidal input signal appears at the primary of polyphase transformer 10, six output signals with 60° phase-separation will appear, one each at the emitters of power transistors 34, 36, 38, 40, 42 and 44.

The collectors of the power transistors 34, 36, 38, 40, 42 and 44 are connected in common to point 50 which sums their signals and presents the summed current at an output terminal 54. The output terminal 54 is provided for the attachment of a lead impedance such as the impedance 58 shown. Connected to common point 50 is a voltage divider resistor 62, which monitors the voltage at common point 50, and is adjusted to exhibit a voltage drop indicative of the voltage level at output terminal 54. The voltage divider resistor 62 is connected to differential amplifier 70 at a controlled voltage input 66, and provides an input signal thereto.

The differential amplifier 70 functions to provide a control voltage at an output terminal 80, which control voltage is dependent upon the difference between the controlled voltage level at terminal 66 and a reference voltage level established within the amplifier. A source of positive potential 72 is connected to amplifier 70 and provides the amplifier with operating power. Typical of the differential amplifiers which may be successfully used as amplifier 70 in this embodiment of applicant's invention is the LM–100 voltage regular manufactured by National Semiconductor. The output terminal 80 is connected to the base of a current driver transistor 88 through a zener diode 84. The zener diode 84 provides a constant voltage drop to match the voltage levels at terminal 80 and the current driver transistor 88.

The emitter of the current driver transistor 88 is clamped to ground 32. A resistor 90 is connected between the anode of zener 84 and the base of transistor 88 to maintain the bias of the base-emitter junction. The collector of current driver transistor 88 is connected to a common point 92 to which the bases of the power transistors 34, 36, 38, 40, 42 and 44 are connected in common. A diode 96 and resistor 100 are connected in series between the collector of current driver transistor 88 and common point 92.

A transistor 104 has its emitter connected to common point 92 and its base-emitter junction connected in parallel with diode 96. Transistor 104 provides a source of base leakage current for the power transistors 34, 36, 38, 40, 42 and 44 during the portion of each cycle when these base-emitter junctions are reversed biased. This transistor is biased by the source 72 of positive potential, and has its collector connected to source 72 through a resistor 108. In addition, the base of transistor 104 is connected to source 72 of positive potential through a resistor 112.

In operation, an AC signal is applied to leads A, B, and C of the Y-connected primary of polyphase transformer 10. This produces three single phase AC signals at coils 12, 14, and 16 respectively, each signal being 120° out of phase with each of the two other signals. Each of the primary coils 12, 14, and 16 provides one inphase and one out-of-phase signal to its secondary coils. Thus the signals at coils 20 and 22 are 180° separated in phase. Similarly, the signals appearing at coils 24 and 26, and those appearing at coils 28 and 30 are phase separated by 180°. The result is that each of the six signals appearing at the secondary coils of polyphase transformer 10 are phase-separated by 60°. Control amplifier 70, in conjunction with the source of positive potential 72, provides a source of control potential at its output terminal 80. This control potential is used to bias current driver 88, which provides current gain to the common point 92. Therefore, a source of regulating current is continually available at the base of each of the six power transistors.

Figure 2A:
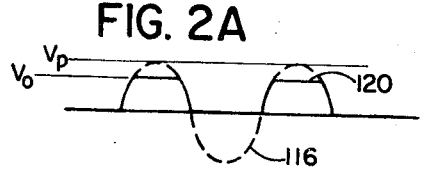
FIG. 2A is a sketch showing the response of one of the power transistors shown in FIG. 1 to a single phase AC input.

Consider now the response of one of the power transistors, for example, power transistor 34, to the single phase AC input at its emitter. Suppose that a voltage $V_0$ is desired at the output terminal 54. Referring to FIG. 2A, an input waveform 116 representative of the signal appearing at one of the secondary coils of polyphase transformer 10, e.g., secondary coil 20, is shown as a dashed line trace. Solid line trace 120 represents the output response of a power transistor, e.g., transistor 34, to the dashed line waveform 116. When the input voltage from secondary coil 20 is initially zero, the emitter-base junction of transistor 34 is reverse biased as is its collector-base junction. At this point, the only current flowing through transistor 34 is attributable to leakage through these junctions and the voltage at the collector of power transistor 34 will be approximately equal to the voltage at the emitter. As the sinusoidal voltage begins to rise, the emitter and collector voltage remain essentially coupled to one another because the transistor is fully turned on by the control signal provided from amplifier 70, until the voltage being provided by secondary coil 20 exceeds the level $V_0 + V_{EC}$. At that point, the regulator action controls the conduction of transistor 34 such that excess supply voltage appears as an increase in emitter-collector voltage for transistor 34.

The regulator, in conjunction with transistor 88, maintains the conduction of transistor 34 throughout the period where the applied voltage exceeds $V_0$. Thus, regulated DC voltage appears at $V_0$ for a minimum of 60° of the line voltage cycle.

Figure 2B:
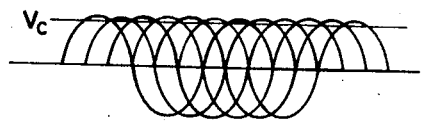
FIG. 2B is a sketch showing the summed output of a six-phase embodiment of applicant's invention.

Referring now to FIG. 2B, six sinusoidal signals separated in phase by 60° are shown. These represent the signals at the six secondary coils shown in FIG. 1. At least one of the sinusoidal signals is at every instant equal to or greater than a certain voltage level $V_c$, called the commutation voltage. Therefore, if in a particular application $V_0 + V_{EC}$ is chosen smaller than $V_c$, the summed output of the power transistors will supply load current and maintain $V_0$ at the desired level. Although shown for the case of a six-phase secondary, the supply may operate with as few as three phases of input but will naturally have greater power losses. In this manner, continuous voltage of a predetermined level may be maintained at output terminal 54.

For proper operation, it is important that the base-emitter junction of the power transistors be able to withstand a back voltage equal to $-V_p$, the reverse peak voltage applied by the secondary coil. The transistor 104 is used to supply the leakage current to the bases of those five transistors which are not in conduction at any point in time. The diode 96 in FIG. 1 reverse biases the emitter-base junction of transistor 104 to reduce the current drive requirement for transistor 88 for maximum control current situations.

The power converter apparatus thus provides AC to DC conversion and regulation without the use of a separate rectifying stage and its power dissipation is inherently lower than that of supplies with separate rectification and regulation stages as a result. Furthermore, since no switching regulator techniques are employed to achieve the regulation, generation of unwanted noise is minimized.

In one successful embodiment of the applicant's invention a 5-volt, 10-amp DC power supply was constructed. The differential amplifier used was an LM-100 amplifier built by National Semiconductor. The power transistors used were chosen to withstand the reverse voltage $-V_p$ imposed during each cycle by the secondary coils.

Figure 3:
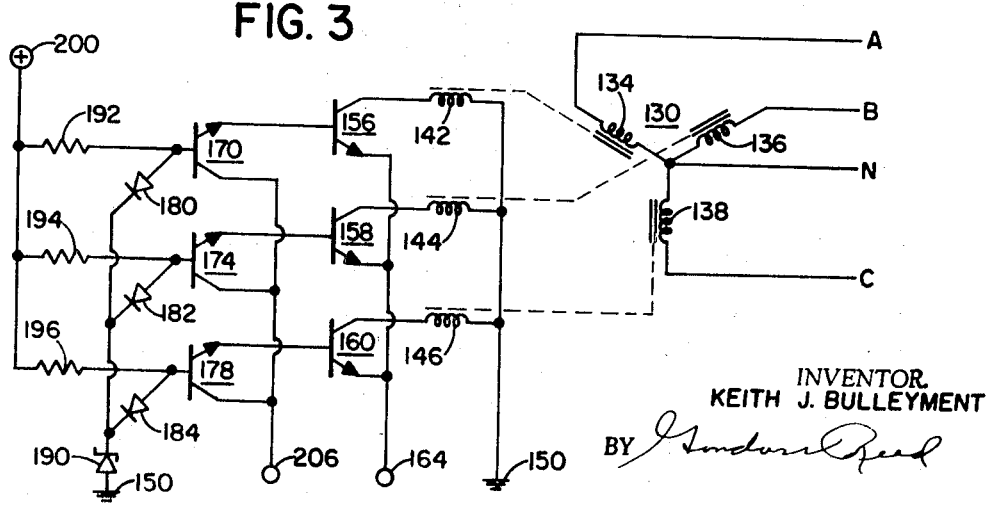
FIG. 3 is an alternative embodiment of applicatn's invention using a different source of base current and is adapted for use with a three-phase secondary coupled to the power transistor stage.

FIG. 3 illustrates an alternative embodiment of the applicant's invention in which a three-phase input is utilized and output voltage regulation is provided in a different manner. A polyphase transformer 130 having Y-connected primary coils 134, 136, and 138 is adapted to receive a polyphase input signal. The polyphase transformer 130 has secondary coils 142, 144, and 146, each of which has one end connected to a ground terminal 150. It should be noted that any means of supplying phase-separated AC signals to the power transistors can be used and polyphase transformers of the Y-connected variety are not essential. The opposite ends of the secondary coils are connected to the collectors of three NPN-power transistors 156, 158 and 160; the emitters of which are connected in common to output terminal 164. Base current for each of these transistors is provided by secondary transistors 170, 174, and 178 the bases of which are connected to diodes 180, 182, and 184. Each of these diodes in turn is connected to a single zener diode 190 which has its opposite end grounded. Additionally, the bases of the transistors 170, 174 and 178 are connected through three references biasing resistors 192, 194 and 196 to a source of positive potential 200. A second source of positive potential is connected to terminal 206 to provide power to the collectors of the secondary transistors 170, 174 and 178.

The embodiment of FIG. 3 operates in a manner somewhat similar to that of FIG. 1, with three major exceptions. First, a reference potential to the bases of power transistors 156, 158 and 160 is provided by the source of positive potential 200 in combination with the reference biasing resistors 192, 194 and 196; diodes 180, 182 and 184; and the zener diode 190. The zener diode voltage plus the forward drop of one diode is chosen such that this reference potential is equal to the voltage desired at the output of the power converter apparatus plus the base-emitter voltages for the secondary and power transistors. Second, the voltage at output terminal 164 is maintained by controlling the voltage at the base of the transistors with the zener diode, rather than with a current gain method as in FIG. 1. Third, in embodiments where the secondary coils are connected to power transistor collectors, as shown in FIG. 3, the negative excursions of the input voltages from the secondary coils 142, 144, and 146 will result in negative voltages at the bases of the power transistors 156, 158 and 160. This means that the zener diode will no longer control the voltage at the input to these transistors and current will be drawn from source of positive potential 200 through the coils to ground 150. In this situation, the diodes 180, 182 and 184 prevent disturbing the reference voltage for the conducting stage.

While the power converter has only been described for the cases of six-phase and three-phase power, it will be understood that the invention is applicable to any input of three or more phases since at least three are necessary for a commutation point greater than zero to exist. Furthermore, although two configurations for positive DC power supply are shown in FIGS. 1 and 3 it will be clear that by choosing PNP rather than NPN-transistors and interchanging appropriate connections, negative DC supplies could be constructed without departing from the basic idea of the applicant's invention. Finally, the source of reference potential applied to the bases of the power transistors is not critical and among other things, either a feedback loop with a control amplifier or a zener diode OR-connected to the three power transistor bases as shown in FIG. 3 may be used.

It will be apparent to those skilled in the art that by increasing the number of phase-separated AC signals a more efficient use of the power input may be made, since a higher voltage output and a greater proportion of the AC waveform may be used to supply the output.

While the invention has been described and illustrated in some detail, it is to be understood that modifications may be made without departing from the spirit and scope of the invention as delineated by the claims.

What is claimed is:

1. A for converting AC voltage to smooth regulated DC voltage of predetermined amplitude, comprising in combination:

transistor means having a plurality of input terminals, a base, and an output terminal;

means connected to the plurality of input terminals for delivering a plurality of overlapping phase separated pulses to the input terminals the nature of said pulses being such that the envelope of the pulse train at all times exceeds said predetermined voltage amplitude;

means for biasing said transistor means such that it operates in linear mode at all times during a complete supply cycle; and control means connected to said base, for controlling current to said base in response to output voltage in a way to limit the voltage at the output terminal of said transistor means to said predetermined amplitude, whereby presentation of a series of overlapping pulses at the respective input terminals of said transistor means results in a smooth DC output voltage signal at said output terminal.

2. Apparatus according to claim 1, wherein said means for delivering pulses includes a polyphase transformer.

3. Apparatus according to claim 1 wherein said means for delivering pulses includes a polyphase transformer for accepting polyphase input signal and producing at a first plurality of terminals a voltage which is in phase with said input signals and for producing at a second plurality of terminals a voltage which is 180° out of phase with said input signals; and means for connecting each of said first and second plurality of terminals to one of said input terminals of said transistor means.

4. Apparatus according to claim 3, wherein said polyphase transformer is a three-phase transformer producing voltage signals at six terminals, said voltage signals being overlapping half-sine waves separated in phase from each other by 60°.

5. Apparatus according to claim 3, wherein said polyphase transformer is adapted for accepting an $n$-phase input signal and producing at $2n$ number of terminals overlapping voltage signals separated in phase by $360/2n$ degrees.

6. Apparatus as defined by claim 1 wherein said transistor means comprise a plurality of transistors.

7. Apparatus as defined by claim 1 wherein said transistor means comprises a multi-emitter transistor.

8. Apparatus as defined by claim 1 wherein the control means connected to said base include a current driver, and a feedback leg is provided to sense the voltage present at said output terminal and to provide an indication thereof for comparison with a reference potential.

9. Apparatus as defined by claim 1 wherein the control means connected to said base include a zener diode and a DC power source connected to the zener diode.

10. Apparatus as defined by claim 8 wherein said input terminals are emitter leads.

11. The apparatus as defined in claim 10, wherein said control means include a differential amplifier, connected to receive the indication from said feedback leg.

12. The apparatus of claim 1 wherein said control means include an OR-connected zener diode.

* * * * *

UNITED STATES PATENT OFFICE
CERTIFICATE OF CORRECTION

Patent No. 3,643,150     Dated February 15, 1972

Inventor(s) Keith J. Bulleyment

It is certified that error appears in the above-identified patent and that said Letters Patent are hereby corrected as shown below:

Column 5, line 6, before "for" delete --A-- and substitute "Apparatus".

Signed and sealed this 18th day of July 1972.

(SEAL)
Attest:

EDWARD M. FLETCHER, JR.      ROBERT GOTTSCHALK
Attesting Officer            Commissioner of Patents